Sept. 27, 1966  E. O. SCHWEITZER, JR  3,275,892
SYSTEM FOR MEASURING CURRENT FLOW IN HIGH
VOLTAGE ELECTRIC POWER LINES FOR
RELAYING AND OTHER PURPOSES
Filed June 7, 1963  2 Sheets-Sheet 1
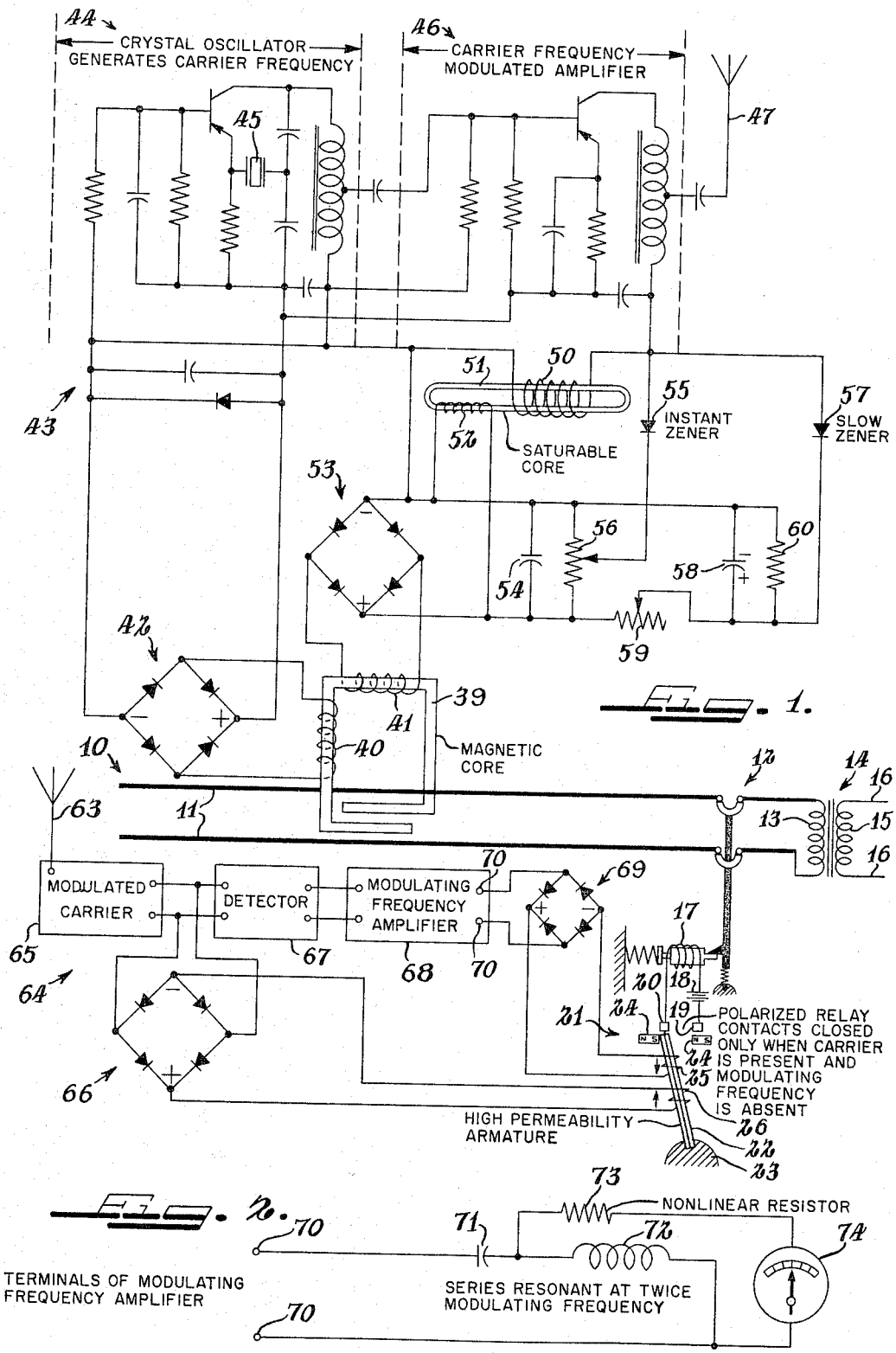

Sept. 27, 1966  E. O. SCHWEITZER, JR  3,275,892
SYSTEM FOR MEASURING CURRENT FLOW IN HIGH
VOLTAGE ELECTRIC POWER LINES FOR
RELAYING AND OTHER PURPOSES
Filed June 7, 1963  2 Sheets-Sheet 2
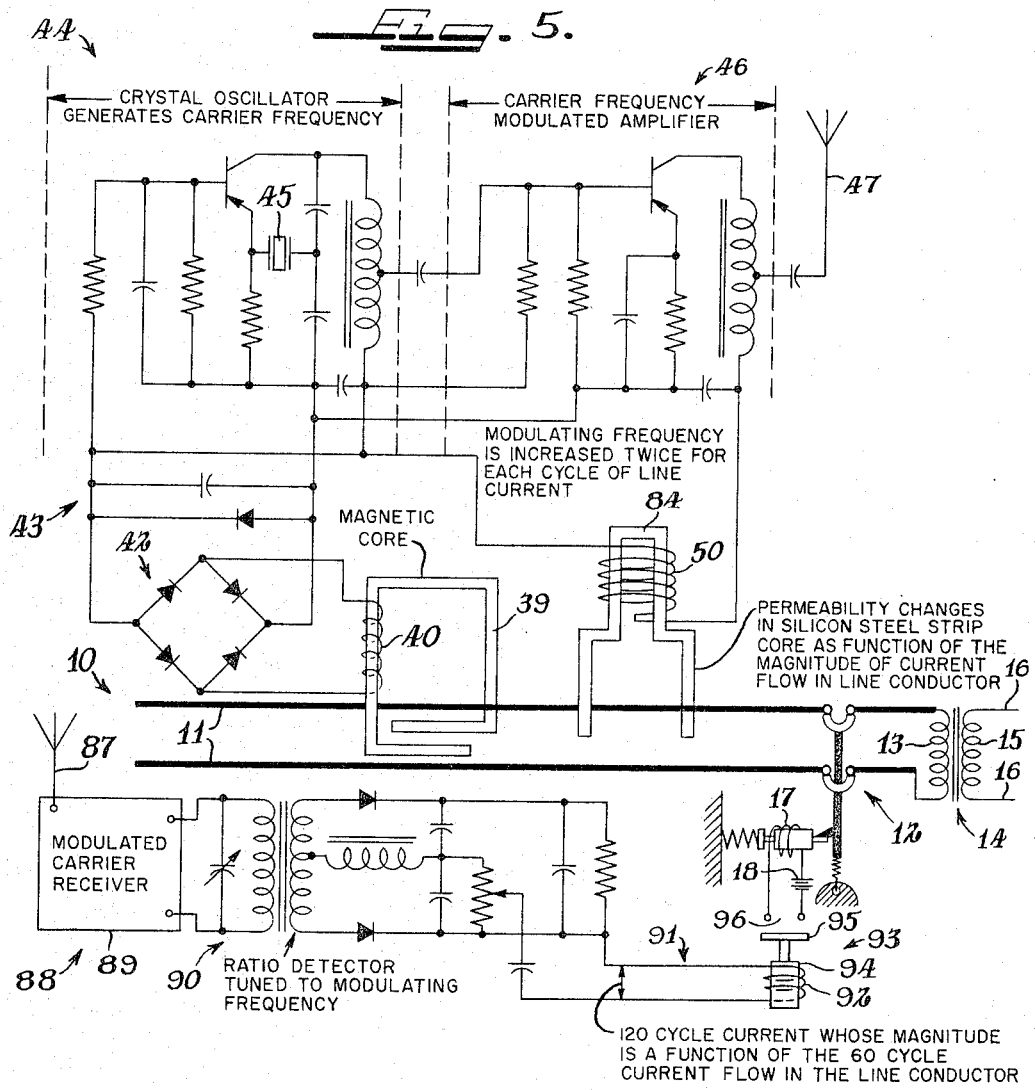
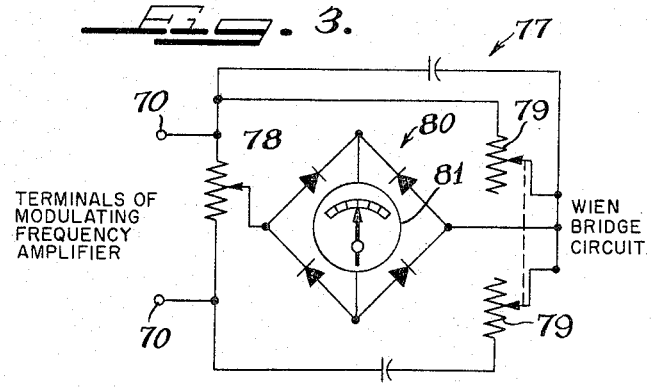
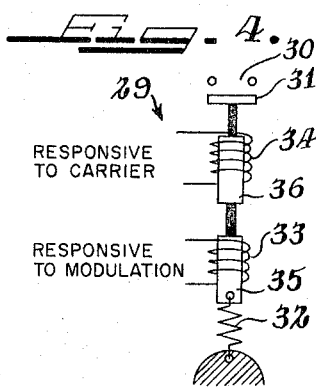

3,275,892
Patented Sept. 27, 1966

3,275,892
SYSTEM FOR MEASURING CURRENT FLOW IN HIGH VOLTAGE ELECTRIC POWER LINES FOR RELAYING AND OTHER PURPOSES
Edmund O. Schweitzer, Jr., 1002 Dundee Road, Northbrook, Ill.
Filed June 7, 1963, Ser. No. 286,345
25 Claims. (Cl. 317—60)

This invention relates, generally, to measuring and control systems and it has particular relation to measuring and controlling the flow of alternating current in a high voltage electric power system. It constitutes an improvement over the systems disclosed in my U.S. Patent No. 2,724,821, issued November 22, 1955, and in my applications Serial No. 9,992, filed February 19, 1960, now Patent 3,197,702, issued July 27, 1965, and Serial No. 253,100, filed January 22, 1963, now Patent 3,233,889, issued December 14, 1965. The transmitter and parts associated therewith and described herein can be mounted in a weather tight housing as disclosed in application Serial No. 278,271, filed May 6, 1963, and arranged for manipulation by a live line tool.

Among the objects of this invention are: To provide for tripping a circuit interrupter for interrupting the flow of current in a circuit in response to a decrease in flow of a control current caused by predetermined increase in flow of current in a circuit; to effect the tripping action either substantially instantaneously in response to a relatively high overload or short circuit or after a time interval the length of which is determined by the magnitude of a relatively low overload and the time of its application to the circuit; to measure the current flow in the circuit and to transmit a corresponding signal to a remote point by a radio transmitter operating at the potential of a conductor forming a part of a circuit with the transmitter having a crystal controlled oscillator for generating a carrier frequency that has applied thereto a modulating frequency of which is varied as a function of the current flow in the conductor; to change the frequency of the modulating frequency by varying the permeability of a magnetic circuit associated with an inductor in a modulating circuit in accordance with the current flow in the conductor; and to measure the magnitude of the current flow in the conductor by causing a unidirectional current flow the magnitude of which is a function of the magnitude of the current flow in the conductor.

In the drawings:

FIG. 1 illustrates diagrammatically a system embodying the present invention and arranged for controlling the tripping of a circuit interrupter under various conditions of overload.

FIG. 2 illustrates diagrammatically one form of measuring circuit that can be employed in conjunction with the system shown in FIG. 1.

FIG. 3 shows another form of measuring circuit that can be employed in lieu of the circuit shown in FIG. 2 for measuring the current flow in the system shown in FIG. 1.

FIG. 4 illustrates an electromagnetic type of relay that can be employed in lieu of the polarized relay illustrated in FIG. 1.

FIG. 5 shows diagrammatically a modified form of the system illustrated in FIG. 1.

Referring now particularly to FIG. 1 of the drawings, it will be observed that the reference character 10 designates, generally, an alternating current electric power system. While the system indicated at 10 is a single phase system, it will be understood that the present invention can be employed in conjunction with a polyphase system. The system 10 includes a power supply circuit formed by conductors 11—11 which may be energized in accordance with conventional practice at voltages ranging upwardly from 34.5 kv. Lower voltages also can be employed. The power supply circuit represented by the conductors 11—11 is connected by a circuit interrupter, shown generally at 12, to energize a primary winding 13 of a power transformer that is indicated, generally, at 14 and is provided with a secondary winding 15 to which a load circuit comprising conductors 16—16 is connected. The load circuit may operate at a relatively low voltage such as the distribution voltage of the order of 2.3 kv. Also it may operate at a voltage of 115 or 230 volts as may be desired.

The means for closing the circuit interrupter 12 are not shown since they are conventional. Also conventional trip means can be employed. For illustrative purposes the trip means is illustrated as including a trip coil 17 that can be energized from a suitable current source such as a battery 18 for tripping the circuit interrupter 12 and permitting its contacts to move to the open circuit position in order to interrupt the flow of current from the power supply circuit represented by the conductors 11—11 to the primary winding 13 of the power transformer 14.

In order to control the energization of the trip coil 17 a relatively stationary contact 19 and a relatively movable contact 20 are provided as parts of a polarized relay that is indicated, generally, at 21. The polarized relay 21 includes an armature 22 of relatively high permeability and it is anchored at one end at 23 so that it can flex between permanent magnets 24—24 under the influence of operating windings 25 and 26 which, as will be described hereinafter, are arranged to be energized from direct current sources, and when so energized, are arranged to generate magnetic fields acting in opposite directions as indicated by the arrows associated with these windings. The construction of the polarized relay 21 is such that normally it is biased to the open position with the contacts 19 and 20 out of engagement as shown in the drawing. The armature 22 and the contact 20 carried thereby remain in the open circuit position as long as the winding 25 remains energized. Under normal operating conditions the winding 26 is also energized. Now, when the winding 25 is deenergized, as described hereinafter, the energization of the winding 26 is such as to overcome the biasing action of the permanent magnets 24—24 as applied to the armature 22. As a result the contact 20 is moved to engage the stationary contact 19 and the energizing circuit for the trip coil 17 is completed to the battery 18. The circuit interrupter 12 then is tripped and the circuit to the primary winding 13 of the power transformer 14 is deenergized.

FIG. 4 illustrates, generally at 29, an electromagnetic relay that can be employed in lieu of the polarized relay 21 that is illustrated in FIG. 1. The relay 29 includes normally open contacts 30 which correspond to the contacts 19 and 20 of the polarized relay 21. The normally open contacts 30 can be bridged by a bridging contact 31 which normally is held in the open position by a spring 32. Operating windings 33 and 34, corresponding to the operating windings 25 and 26 of the polarized relay 21, cooperate with armatures 35 and 36, respectively, for controlling the closing of the normally open contacts 30 in the manner described for the polarized relay 21.

Since the power supply circuit represented by the conductors 11—11 operates at a relatively high voltage, it is desirable to take advantage of the insulation of the circuit and to mount current measuring means thereon to operate at its potential for measuring the current flow in the power supply circuit in order to determine whether the circuit interrupter 12 should be tripped and under what conditions it should be tripped. For this purpose there is provided a magnetic core 39, FIG. 1, which links one of the conductors 11. The magnetic core 39 functions as the magnetic core of a current transformer having a single turn primary winding that is represented by the conductor 11 which it embraces. Located on the magnetic core 39 are secondary windings 40 and 41 in which alternating current is induced on flow of current in the conductor 11 associated with the magnetic core 39.

The secondary winding 40 is connected across a bridge type rectifier as indicated, generally, at 42 which is employed to energize a radio transmitter that is indicated, generally, at 43 and may be constructed as shown in my copending applications Serial Nos. 9,992 and 253,100, referred to above. The radio transmitter 43 includes an oscillator, indicated generally at 44, and provided with a crystal 45 for generating a carrier frequency. The output of the oscillator 44 is amplified by an amplifier, indicated generally at 46, and is applied to an antenna 47 for radiating the carrier frequency from the oscillator 44 as modulated by a modulating frequency which is provided, in part, by a modulating inductor 50 which, together with the distributed capacity of the associated circuits in the transmitter 43 and the capacitors is tuned to generate a modulating frequency which, for illustrative purposes, may be 3,000 cycles per second. It will be observed that the modulating frequency is substantially different from the frequency at which the power system 10 operates, this being normally 60 cycles per second. Now it will be understood that the oscillator 44 is arranged to generate a carrier frequency which may be 27.4 megacycles. This carrier frequency is modulated by a modulating frequency of 3,000 cycles per second. The modulated carrier frequency is radiated from the antenna 47.

It will be observed that the modulating inductor 50 is wound around a saturable magnetic core 51 on which there is wound a saturating winding 52. Since the modulating conductor 50 is wound entirely around the saturable core 51 while the saturating winding 52 is wound around a leg of the saturable core 51, the modulating indictor 50 is non-inductively related to the saturating winding 52. However, the permeability of the core 51 is changed by change in the magnitude of direct current flow through the saturating winding 52 to vary the inductance of the modulating inductor 50 and thus effect a corresponding increase in the modulating frequency from the selected value which, as indicated above, may be 3,000 cycles per second.

The saturating winding 52 is energized from a bridge type rectifier 53 that is connected across the secondary winding 41. It will be apparent that the magnitude of the direct current flowing through the saturating winding 52 is a function of the magnitude of the alternating current induced in the secondary winding 41. Since this is a function of the magnitude of the current flow in the conductor 11, the saturation of the core 51 is varied as a function of the magnitude of the current flow in the conductor 11. The result of this arrangement is that the frequency of the modulating frequency is varied as a function of the magnitude of the current flow in the conductor 11. A capacitor 54 connected across the terminals of the bridge type rectifier 53 serves to remove some of the ripple caused by the energizing alternating current.

It is desirable that the modulating frequency be caused to cease under two different operating conditions of the current flow in the power supply circuit represented by the conductors 11—11. In the event that the flow of alternating current in the power supply circuit is extremely high, such as occurs under short circuit conditions, it is desirable that the modulating frequency be terminated instantaneously upon the occurrence of such magnitude of current flow. Another condition involves the flow of a predetermined current in the power supply circuit represented by the conductors 11—11 which exceeds the normal current flow for which it is desired with the overload current flowing for a longer or shorter period depending upon the adjustment of the system. For example, with a relatively slight overload and a relatively long time, it is desirable that the modulating frequency be terminated. Likewise, with a slightly higher overload it is desirable that the modulating frequency be terminated at the end of a slightly lesser time interval. Thus, in addition to providing for substantially instantaneously discontinuing the modulating frequency, provision is made for discontinuing it in an inverse time current relationship.

For the purpose of discontinuing the modulating frequency substantially instantaneously on the occurrence of an unusually large flow of current in the power supply circuit represented by the conductors 11—11, such as a short circuit, a relatively large current is induced in the secondary winding 41 which generates a relatively large voltage across the terminals of the bridge type rectifier 53. In turn there is a corresponding increase in the direct voltage that appears across its output terminals. Advantage is taken of this high direct voltage to break down a Zener diode 55 and render it conducting. The voltage at which this takes place can be adjusted by a potentiometer 56 which is connected across the output terminals of the rectifier 53. When the Zener diode 55, which is indicated in FIG. 1 as an instant Zener, breaks down or becomes conducting, it short circuits the modulating inductor 50. As a result the modulating frequency is terminated substantially instantaneously.

In order to take care of the inverse time current operation another Zener diode 57 is provided and this is indicated in the diagram in FIG. 1 as a slow Zener. The Zener diode 57 is arranged to break down and be rendered conducting when a capacitor 58 connected across the output terminals of the bridge type rectifier 53 is charged to a predetermined voltage which is determined by a potentiometer 59. A load resistor 60 is connected in parallel with the capacitor 58. It will be understood that, on suitable adjustment of the potentiometer 59, the Zener diode 57 will break down and become conducting in accordance with the charge on the capacitor 58 which is created by the rectifier 53 in accordance with the energization thereof as a function of the current flow in the power supply circuit represented by the conductors 11—11. Depending upon the selected time current relationship for charging the capacitor 58, the Zener diode 57 will break down and become conducting to short circuit the modulating inductor 50 and cause the modulating frequency to cease leaving only the carrier frequency to be transmitted by the antenna 47.

Preferably the magnetic core 39 with the windings 40 and 41 thereon together with the rectifiers 42 and 53, the radio transmitter 43 and control circuits associated therewith are mounted to operate at the potential of the associated conductor 11. For example, they may be mounted in the manner described in my application Serial No. 278,271 above referred to.

The carrier frequency from the radio transmitter 43, modulated or unmodulated, is radiated by the antenna 47 to an antenna 63 that is associated with a radio receiver which is indicated, generally, at 64 and is located at a point that is remote from the transmitter 43. For example, the radio receiver 64 can be located on or near the ground directly underneath the radio transmitter 43 or in the immediate vicinity. This makes it possible to take advantage of the insulation of the power supply circuit represented by the conductors 11—11.

The carrier frequency modulated or unmodulated is applied to a modulated carrier frequency receiving section that is indicated at 65. This may include an intermediate frequency section. A bridge type rectifier, indicated generally at 66, is connected across the section 65 to provide at its output terminals a direct voltage the magnitude of which is a function of the carrier frequently either directly or indirectly from an intermediate frequency section. The latter is preferred since more energy is available for operating the bridge type rectifier 66. However, it will be understood that the output of the rectifier 66 is determined by the presence or absence of the carrier frequency. Also connected to the section 65 is a detector section 67 by means of which the modulating frequency is detected and applied to an amplifier section 68 which has associated therewith a bridge type rectifier 69.

It will be observed that the direct voltage at the output terminals of the rectifier 69 is employed for energizing the operating winding 25. As a result this winding is energized as long as the modulating frequency is being transmitted. The output terminals of the rectifier 66 are connected to the operating winding 26. Accordingly, it is energized as long as the carrier frequency is being transmitted.

When the modulating frequency is terminated, either as the result of the breakdown of the instant Zener 55 or of the slow Zener 57, the operating winding 25 is no longer energized. Its influence opposing the action of the operating winding 26 ceases and, since this winding continues to be energized because of the continued transmission of the carrier frequency, the biasing action provided by the permanent magnets 24—24 on the armature 22 is overcome. The armature 22 then flexes and swings contact 20 into engagement with stationary contact 19 to complete the energizing circuit for the trip coil 17. The circuit interrupter 12 then is opened and current no longer flows to energize the primary winding 13. On opening of the circuit interrupter 12, current no longer flows in the power supply circuit represented by the conductors 11—11. The oscillator 44 then ceases to generate the carrier frequency. Accordingly, the operating winding 26 is deenergized. The armature 22 of the polarized relay 21 then can be returned manually or otherwise to the latched open position.

It will be understood that the relay 29 can be employed in lieu of the polarized relay 21. When this substitution is made, the operating winding 33 is connected for energization across the output terminals of the rectifier 69. The operating winding 34 is connected for energization across the output terminals of the rectifier 66. As long as the modulated carrier is being transmitted, the bridging contact member 31 is held out of engagement with the normally open contacts 30. When the modulation ceases, the operating winding 34 which continues to be energized in response to the continued application of the carrier frequency cooperates with the armature 36 to overcome the biasing action of the spring 32. The contacts 30 are closed to energize the trip coil 17 and open the circuit interrupter 12.

When either the polarized relay 21 or the electromagnetic relay 29 is used, in the absence of both the carrier frequency and the modulating frequency, the control circuit for the trip coil 17 remains open. Such a condition exists when the power supply circuit represented by the conductors 11—11 is deenergized. On energization under normal operating conditions both the carrier and the modulating frequency are transmitted in the manner described and the relays 21 and 29 are maintained in the non-operated positions. For operation only of the relays 21 and 29, it is unnecessary to employ the saturating winding 52. That is employed when it is desired to obtain a measurement of the magnitude of the current flow in the power supply circuit.

In FIG. 2 there is illustrated one current measuring system that can be employed and connected for energization to terminals 70—70 of the amplifier section 68. It will be understood that the measuring system shown in FIG. 2 can be connected in parallel with rectifier 69 or in lieu thereof if only a measuring function is to be employed. The measuring system shown in FIG. 2 includes a capacitor 71 and an inductor 72 that are tuned to series resonance at a frequency that is twice the frequency of the modulating frequency. For example, when the modulating frequency is 3,000 cycles per second, the series resonant circuit comprising the capacitor 71 and the conductor 72 operates at 6,000 cycles per second. Advantage is taken of the presence of the fundamental and its second harmonic to obtain a direct current component through a non-linear resistor 73 for application to a unidirectional current measuring device 74 such as a d'Arsonval type instrument. When the modulating frequency increases under the control of the saturating winding 52, the phase angle between the fundamental frequency and the second harmonic thereof as applied to the non-linear resistor 73 varies and this change causes a corresponding change in the direct current component in the current flow through the non-linear resistor 73 which is applied to the measuring device 74 that can be calibrated in alternating current amperes to indicate the magnitude of the current flow in the power supply circuit represented by the conductors 11—11.

FIG. 3 shows, generally, at 77 a Wien bridge circuit that includes a potentiometer 78 which is connected between the terminals 70—70 of the amplifier section 68. Gang adjustable potentiometers 79—79 form opposite arms of the bridge circuit across which a bridge type rectifier, shown generally at 80, is connected. A unidirectional current measuring device 81 is connected across the output terminals of the rectifier 80 and the scale is calibrated in alternating current amperes.

Referring now particularly to FIG. 5, it will be observed that the radio transmitter 43, as previously described, is associated with one of the conductors 11. In this embodiment of the invention the magnetic core 39 is employed with only the secondary winding 40 for energizing the transmitter 43. The modulating inductor 50 is located on a U-shaped magnetic core 84 the arms of which are positioned on opposite sides of one of the conductors 11 so that the permeability of the core 84, which may be in the form of a silicon steel strip, varies as a function of the current flow in the associated conductor 11. Assuming that the modulating frequency applied to the carrier frequency generated by the oscillator 44 has a frequency of 3,000 cycles per second, this frequency is raised on each half cycle of the 60-cycle alternating current in the power supply circuit represented by the conductors 11—11 and is returned to the 3,000-cycle value when the 60-cycle current passes through zero. Thus the modulating frequency is varied as a function of the current flow in the power supply circuit represented by the conductors 11—11 and the magnitude of the variation is a function of the magnitude of the current flow in each half cycle of the 60-cycle alternating current.

While a frequency of 3,000 cycles for the modulating frequency has been referred to, it will be understood that other frequencies, such as 1,000, 2,000 or 5,000 cycles per second, can be employed.

The modulated carrier frequency is radiated from the antenna 47 in FIG. 5 and is received by an antenna 87 on a radio receiver that is indicated, generally, at 88 which is located at a remote point. The receiver includes a modulated carrier receiving section 89 with which there is associated a ratio detector that is indicated, generally, at 90. The output circuit 91 from the ratio detector has applied thereto a 120-cycle per second current flow the amplitude of which is a function of the flow of 60-cycle current in the power supply circuit represented by the conductors 11—11. The 120-cycle current is employed to energize operating winding 92 of an electromagnetic relay that is indicated, generally, at 93. It cooperates with an armature 94 that carries a bridging contact 95 which is arranged to close normally open contacts 96 when the magnitude of the 120-cycle energizing current flowing through the operating winding 92 is sufficient to move the bridging contact 95 into engagement with the contacts 96. Thereupon the energizing circuit for the trip coil 17 is completed from the battery 18. The circuit interrupter 12 is tripped and current ceases to flow in the power supply circuit represented by the conductors 11—11.

What is claimed as new is:

1. Apparatus for measuring the flow of current in a high voltage electric power transmission line conductor and transmitting a corresponding signal to a remote point comprising:
(a) a transmitter operating at the potential of said conductor and arranged and adapted to transmit a carrier frequency,
(b) a modulating circuit connected to said transmitter for normally continuously applying a modulating frequency to said carrier frequency,
(c) means responsive to current flow in said conductor for varying the frequency of said modulating frequency as a function of the magnitude of such current flow,
(d) a receiver at said remote point arranged and adapted to receive said carrier frequency modulated by said modulating frequency, and
(e) means responsive to the received modulating frequency.

2. The invention, as set forth in claim 1, wherein the transmitter includes a crystal controlled oscillator for generating the carrier frequency.

3. The invention, as set forth in claim 1, wherein the transmitter comprises:
(a) a crystal controlled oscillator for generating the carrier frequency, and
(b) an amplifier, and
(c) the modulating frequency is applied to the amplifier.

4. The invention, as set forth in claim 1, wherein the modulating circuit includes an inductor the inductance of which is varied in accordance with the current flow in the conductor.

5. The invention, as set forth in claim 4, wherein:
(a) the inductor is associated with a magnetic core, and
(b) the permeability of said core is varied in accordance with the current flow in the conductor.

6. The invention, as set forth in claim 4, wherein the modulating circuit is tuned to resonate at a predetermined frequency in the absence of current flow in the conductor.

7. Apparatus for measuring the flow of current in a high voltage electric power transmission line conductor and transmitting a corresponding signal to a remote point comprising:
(a) a transmitter operating at the potential of said conductor and arranged and adapted to transmit a carrier frequency,
(b) means for modulating said carrier frequency with a modulating frequency,
(c) means for controlling said modulating frequency in accordance with the current flow in said conductor,
(d) a receiver at said remote point arranged and adapted to receive said carrier frequency modulated by said modulating frequency,
(e) means responsive to the received carrier frequency and unresponsive to the received modulating frequency, and
(f) means responsive only to said received modulating frequency.

8. The invention, as set forth in claim 7, wherein means responsive to predetermined current flow in the conductor reduce the modulating frequency to a predetermined value.

9. The invention, as set forth in claim 7, wherein means responsive to predetermined current flow in the conductor for a predetermined time reduce the modulating frequency to a predetermined value.

10. The invention, as set forth in claim 7, wherein a relay is responsive to the received carrier frequency and the received modulating frequency and is operated according to whether both frequencies are being received.

11. Apparatus for measuring the flow of current in a high voltage electric power transmission line conductor and transmitting a corresponding signal to a remote point comprising:
(a) a transmitter operating at the potential of said conductor and arranged and adapted to transmit a carrier frequency,
(b) means for modulating said carrier frequency with a modulating frequency,
(c) means for controlling said modulating frequency in accordance with the current flow in said conductor,
(d) a receiver at said remote point arranged and adapted to receive said carrier frequency modulated by said modulating frequency,
(e) a relay including a movable contact and a pair of operating windings,
(f) means responsive to the received carrier frequency and connected to energize one of said windings and move said contact from one position to another position, and
(g) means responsive to the received modulating frequency and connected to energize the other of said windings for opposing the action of said one winding for moving said contact as aforesaid.

12. The invention, as set forth in claim 11, wherein means responsive to flow of fault current in the conductor disable the modulating means and thereby effect the deenergization of the other winding of the relay whereupon the contact is moved to the other position.

13. The invention, as set forth in claim 11, wherein means responsive to flow of overload current in the conductor for a predetermined time disable the modulating means and thereby effect the deenergization of the other winding of the relay whereupon the contact is moved to the other position.

14. The invention, as set forth in claim 7, wherein the means responsive only to the modulating frequency comprises:
(a) a circuit that is resonant to the second harmonic of said modulating frequency,
(b) a non-linear resistor, and
(c) a unidirectional current measuring device.

15. The invention, as set forth in claim 7, wherein the means responsive only to the modulating frequency comprises a Wien bridge circuit.

16. The invention, as set forth in claim 7, wherein the modulating frequency control means comprises:
(a) an inductor,
(b) a saturable magnetic core for said inductor,
(c) a saturating winding on said core,
(d) rectifier means for energizing said saturating winding, and
(e) a winding for energizing said rectifier means inductively related to the conductor.

17. The invention, as set forth in claim 16, wherein the inductor embraces the saturable magnetic core in non-inductive relation to the saturating winding.

18. Apparatus for measuring the flow of alternating current in a high voltage electric power transmission line conductor and transmitting a corresponding signal to a remote point comprising:
(a) a transmitter operating at the potential of said conductor and arranged and adapted to transmit a carrier frequency,
(b) a modulating circuit connected to said transmitter for normally continuously applying a modulating frequency to said carrier frequency,
(c) an inductor included in said modulating circuit, and
(d) a magnetic core associated with said conductor and said inductor, and
(e) the inductance of said inductor being varied by change in permeability of said magnetic core in accordance with the change in magnitude in flow of alternating current in said conductor to cause corresonding change in the frequency of said modulating frequency.

19. Apparatus for measuring the flow of alternating current in a high voltage electric power transmission line conductor and transmitting a corresponding signal to a remote point comprising:
- (a) a transmitter operating at the potential of said conductor and arranged and adapted to transmit a carrier frequency,
- (b) a modulating circuit connected to said transmitter for normally continuously applying a modulating frequency to said carrier frequency,
- (c) an inductor included in said modulating circuit, and
- (d) a generally U-shaped magnetic core having its arms positioned on opposite sides of said conductor with said inductor commonly embracing said arms whereby said modulating frequency is changed twice for each cycle of alternating current flow in said conductor to an extent depending upon the magnitude of the alternating current in each half cycle.

20. In an electric power transmission system:
- (a) a power supply circuit and a load circuit,
- (b) circuit interrupter means interconnecting said circuits and trip means therefor,
- (c) relay means for controlling said trip means including:
  - (1) a movable contact,
  - (2) a first operating winding normally energized and acting to move said contact and energize said trip means, and
  - (3) a second operating winding when energized opposing said first operating winding and preventing movement of said contact,
- (d) means responsive to normal current flow in said system for energizing said second operating winding, and
- (e) means responsive to flow of abnormal current in said system for deenergization said second operating winding.

21. The invention, as set forth in claim 20, wherein the relay means is polarized and is arranged and adapted to prevent movement of the contact to operate the trip means when the first operating winding is deenergized.

22. In an electric power transmission system:
- (a) a power supply circuit and a load circuit,
- (b) circuit interrupter means interconnecting said circuits and trip means therefor,
- (c) means for deriving from said system:
  - (1) a first current caused by current flow in said system, and
  - (2) a second current the magnitude of which is a function of the magnitude of the current flow in said system, and
- (d) relay means for controlling the operation of said trip means,
- (e) said relay means being responsive to said first and second currents and arranged and adapted to operate said trip means to open said circuit interrupter means only when the magnitude of said second current is at a predetermined value.

23. The invention, as set forth in claim 22, wherein means responsive to fault current flow in the system reduce the second current flow to the predetermined value to operate the relay means in turn to operate the trip means.

24. The invention, as set forth in claim 22, wherein means responsive to overload current flow in the system for a predetermined time reduce the second current flow to the predetermined value to operate the relay means in turn to operate the trip means.

25. The invention, as set forth in claim 22, wherein:
- (a) the relay means is polarized and includes a movable contact biased thereby to open circuit position with respect to the trip means,
- (b) first and second windings on said relay means are responsive to the first and second currents respectively and act in opposition to each other,
- (c) means energize said first winding with unidirectional current whose magnitude is independent of the magnitude of alternating current flow in the system, and
- (d) means energize said second winding with unidirectional current whose magnitude is dependent on the magnitude of alternating current flow in said system.

References Cited by the Examiner

UNITED STATES PATENTS

| 2,508,198 | 5/1950 | Sonnemann | 317—27 |
| 2,863,100 | 12/1958 | Rice | 317—27 |
| 3,223,889 | 12/1965 | Schweitzer | 317—14 |

FOREIGN PATENTS

| 561,621 | 8/1958 | Canada. |

MILTON O. HIRSHFIELD, *Primary Examiner.*

MAX L. LEVY, *Examiner.*

R. V. LUPO, *Assistant Examiner.*